United States Patent [19]

Chappell et al.

[11] Patent Number: 4,512,246

[45] Date of Patent: Apr. 23, 1985

[54] PERCOLATOR INCLUDING PUMP-TYPE DISPENSER

[75] Inventors: William A. Chappell, Raytown; William J. Tweed, Kansas City; David T. Higgins, Lee's Summit, all of Mo.

[73] Assignee: Rival Manufacturing Company, Kansas City, Mo.

[21] Appl. No.: 629,351

[22] Filed: Jul. 10, 1984

Related U.S. Application Data

[63] Continuation-in-part of Ser. No. 453,787, Dec. 27, 1982, Pat. No. 4,464,983.

[51] Int. Cl.³ ............................................. A47J 31/00
[52] U.S. Cl. ........................................ 99/312; 99/280; 222/209
[58] Field of Search ................. 99/280, 281, 282, 283, 99/279, 287, 310, 311, 312, 314, 313, 315, 316, 288; 222/209, 131; 426/433

[56] References Cited

U.S. PATENT DOCUMENTS

| | | | |
|---|---|---|---|
| 3,129,318 | 4/1964 | Morrison | 99/310 |
| 3,905,520 | 9/1975 | Nishioka | 222/209 |
| 4,174,053 | 11/1979 | Shimizu | 222/131 |
| 4,344,548 | 8/1982 | Frazier | 222/209 |
| 4,359,174 | 11/1982 | Ikunosuke | 222/383 |

Primary Examiner—Robert W. Jenkins
Attorney, Agent, or Firm—Willian Brinks Olds Hofer Gilson & Lione

[57] ABSTRACT

A percolator/dispenser is disclosed which includes an insulated container having a hinged lid. A percolator heater, tube, and basket are mounted inside the container, and a manually operated pressure pump is included in the lid of the container. This pressure pump operates to pump air from the outside of the container to the inside of the container when operated. A discharge spout is movable between (1) a vented position, in which a vent path is provided between the spout and an upper portion of the interior of the container, (2) a dispensing position, in which the spout is connected to a tube which extends down to a lower portion of the interior of the container, and (3) a sealed position, in which the spout is sealed. An interlock is provided which insures that the percolator can not be activated unless the spout is in the vented position, thereby automatically preventing overpressurization of the insulated container due to inadequate venting during operation of the percolator.

16 Claims, 16 Drawing Figures

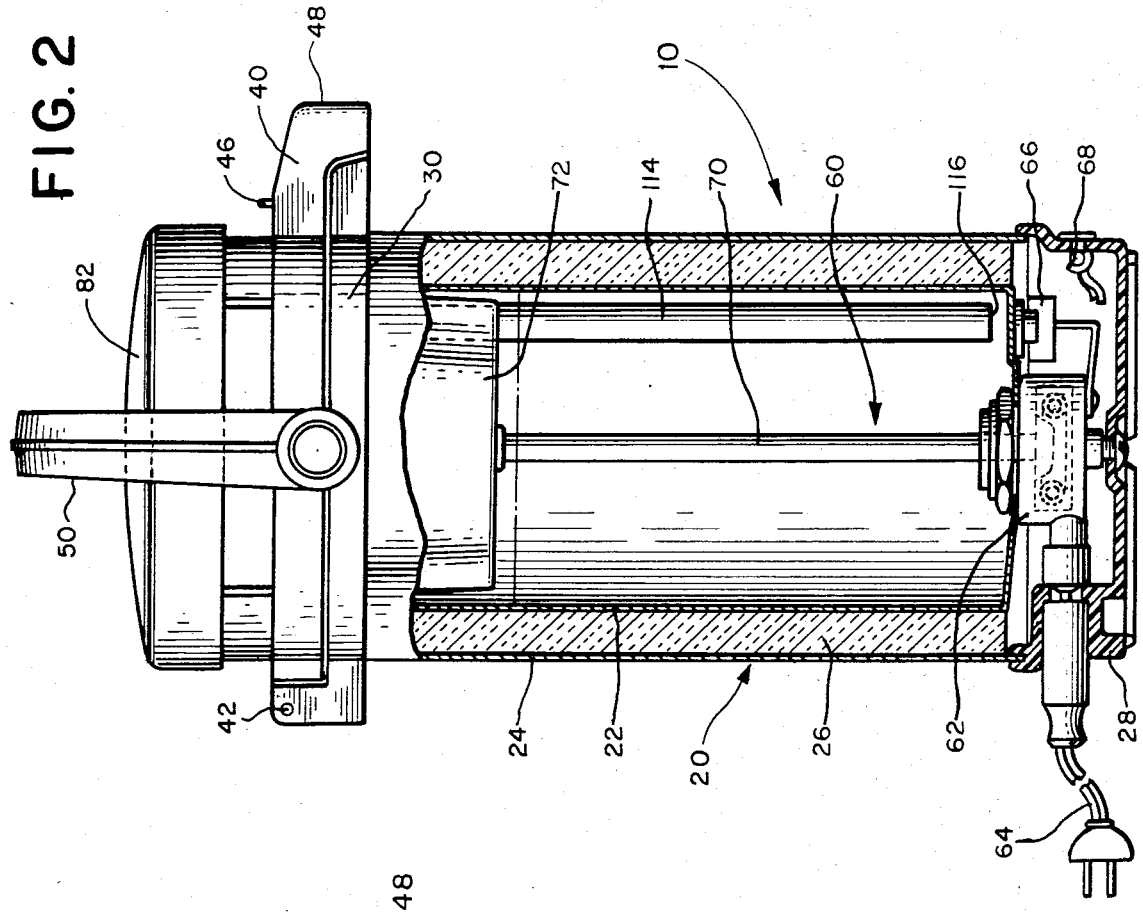
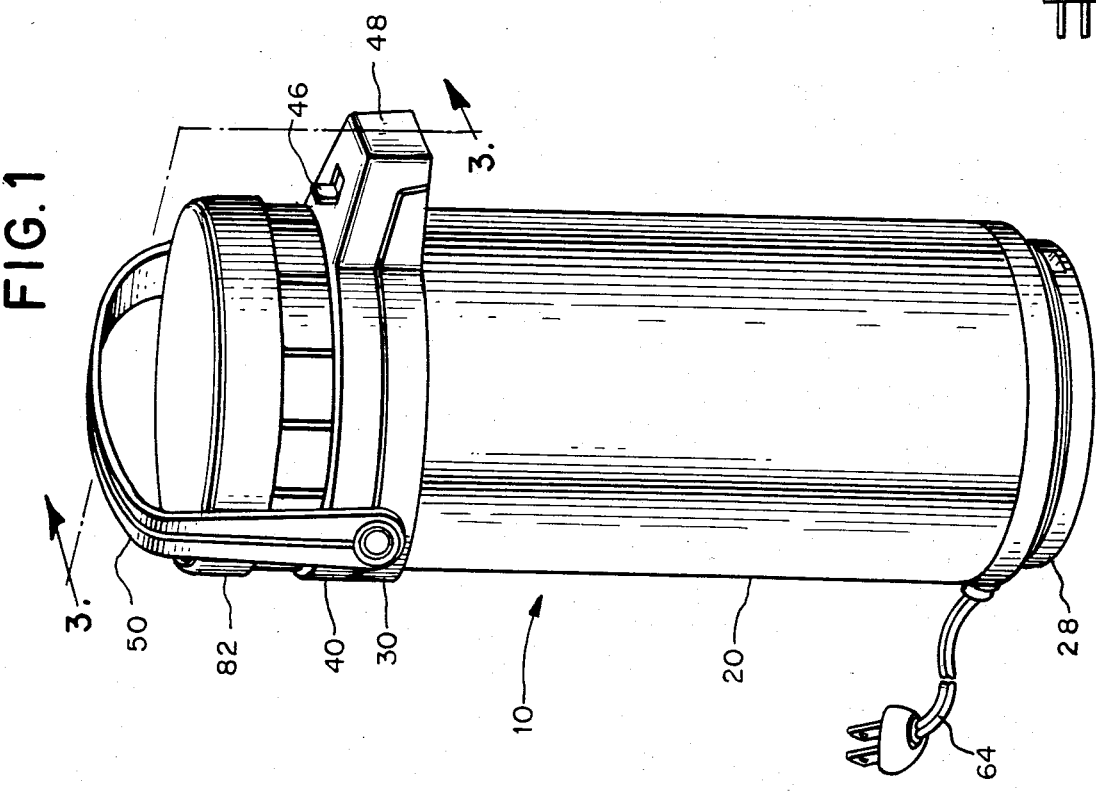

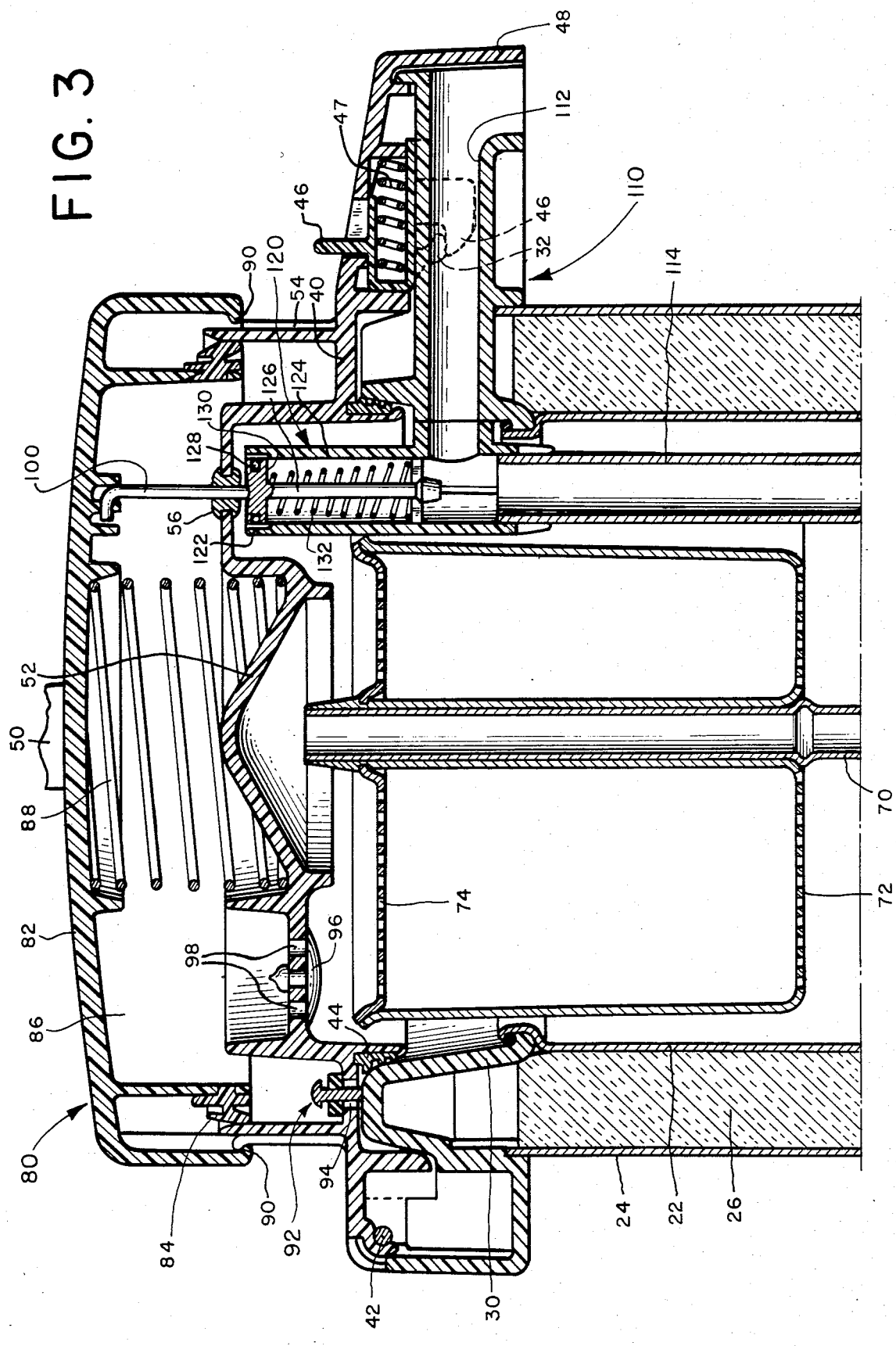

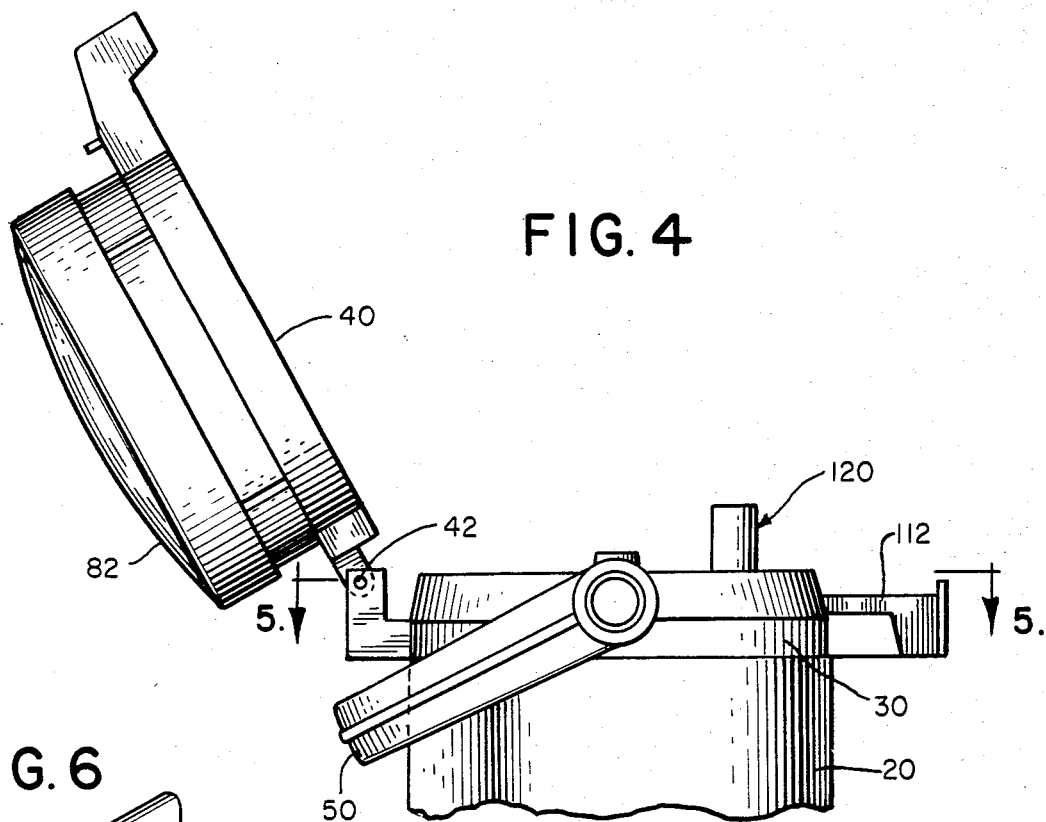
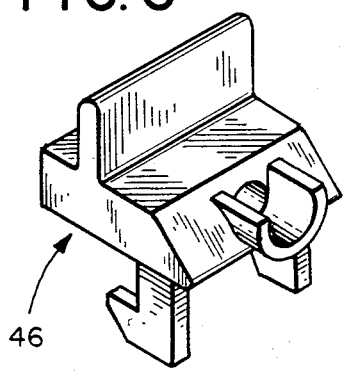
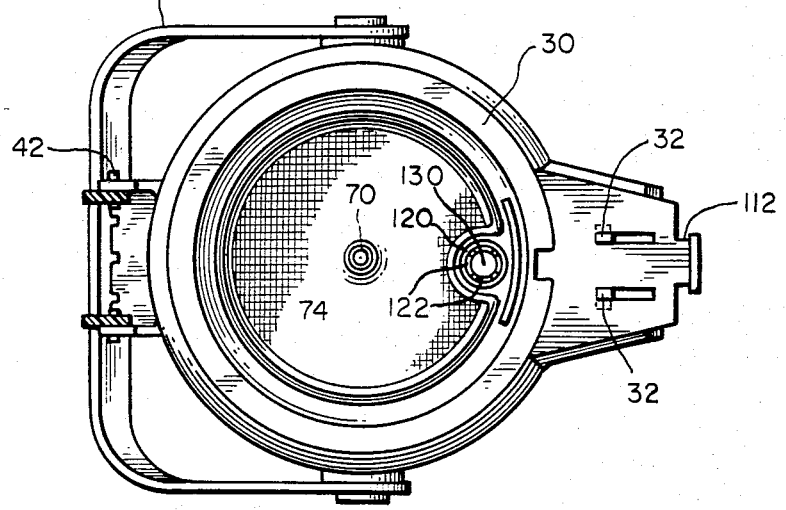

FIG. 8
Perc (Vented)
FIG. 9
Pump
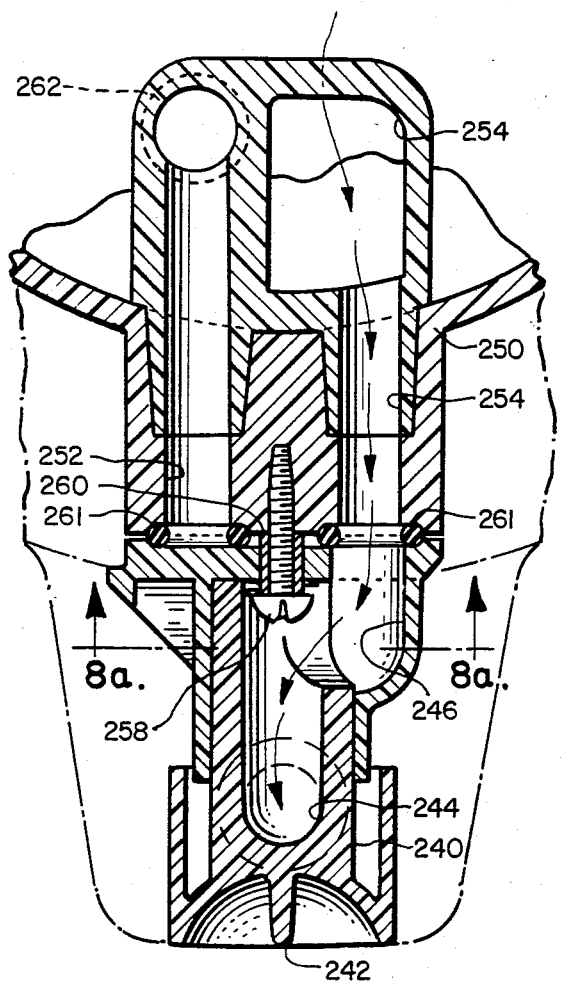
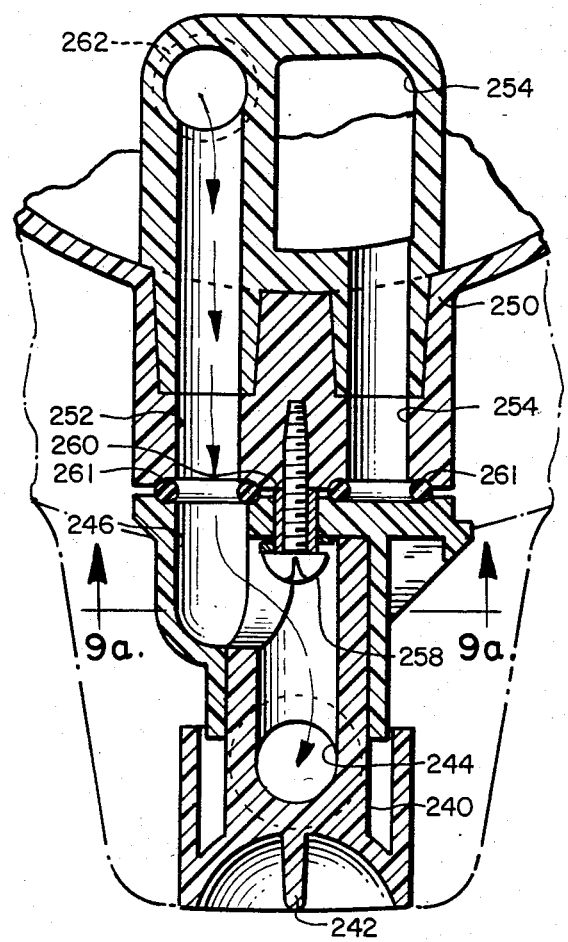
FIG. 8a
(SWITCH ON)
FIG. 9a
(SWITCH OFF)
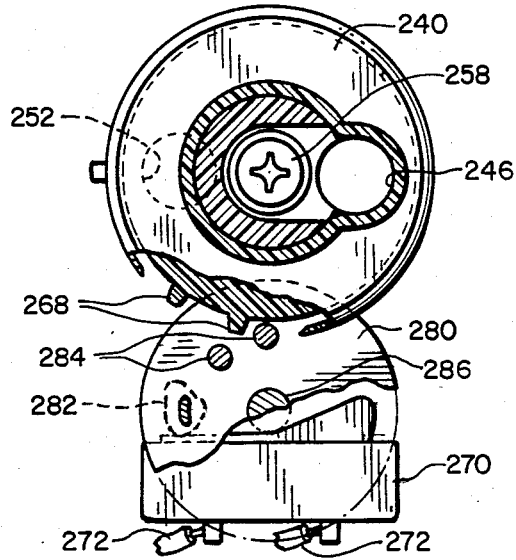
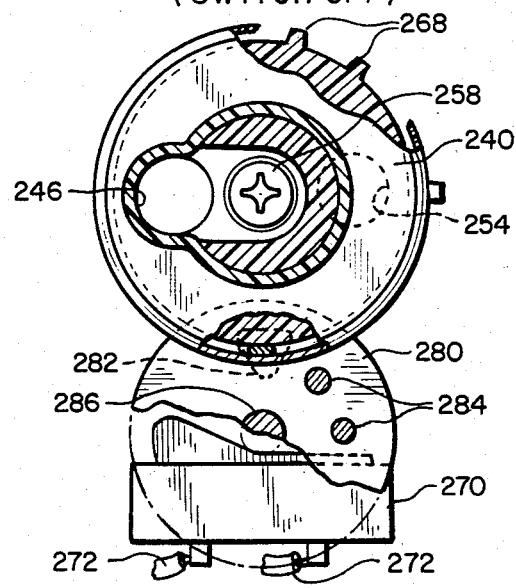

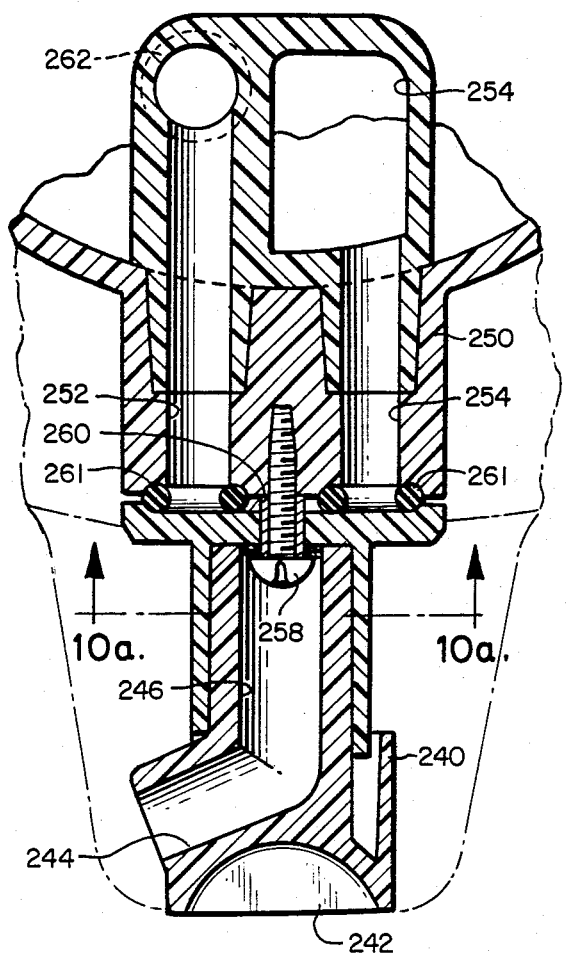
FIG.10 Sealed
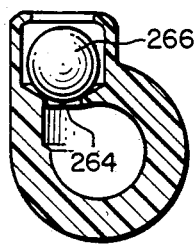
FIG.12
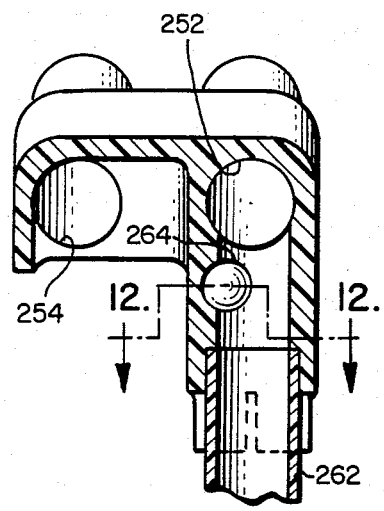
FIG.11
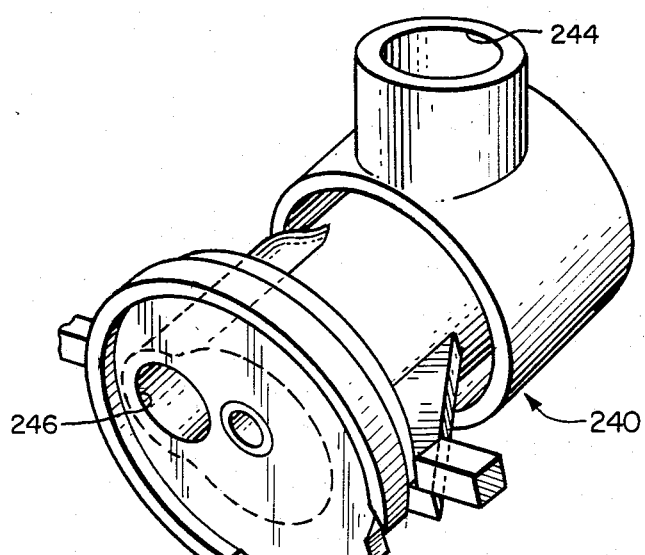
FIG.13
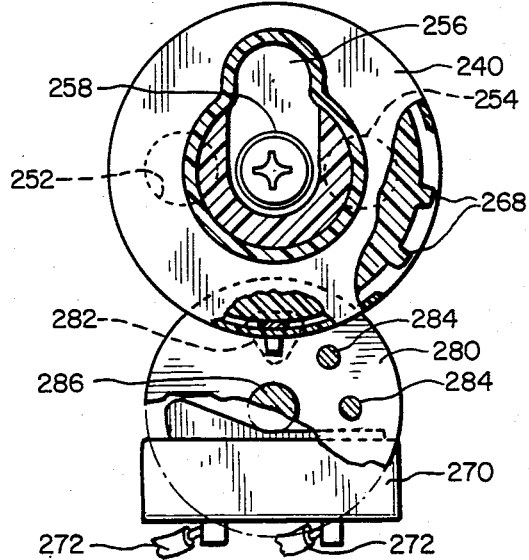
FIG.10a (SWITCH OFF)

PERCOLATOR INCLUDING PUMP-TYPE DISPENSER

BACKGROUND OF THE INVENTION

This application is a continuation-in-part of copending application Ser. No. 06/453,787, filed Dec. 27, 1982, now U.S. Pat. No. 4,464,983.

The present invention relates to an improved, insulated percolator which includes a manually operated pump for dispensing liquids from the percolator.

A wide variety of products are presently available to the consumer public, including both coffee percolators and insulated containers which include manually operated pumps for dispensing liquids from the containers. However, a combined percolator/dispenser of the type described below is not presently available.

In part, this may be because of the tension between percolators and pressure-type pumps. On the surface, it would appear that percolators, which generate steam and therefore elevated pressures in use, cannot readily be combined with pressure pump-type dispensers. This is because pressure pump-type dispensers require that the vessel containing the liquid being dispensed must not be vented in order for the pressure pump to force liquid out of the vessel. In contrast, percolators generate steam in use and are therefore typically vented to atmosphere. These venting requirements of a percolator are to some extent at odds with the sealed vessel requirements of a pressure pump dispenser.

A need presently exists for an improved percolator which is insulated to allow percolated coffee to be kept hot for extended periods of time, and which includes a manually operated dispensing pump to allow liquids to be dispensed from the container without opening the container.

SUMMARY OF THE INVENTION

This invention is directed to an improved percolator/dispenser which combines a percolator with an insulated vessel that includes a pump-type dispenser. The present invention resolves the conflict between the venting requirements of the percolator and the sealing requirements of the pump dispenser.

According to this invention, a percolator/dispenser is provided which includes an insulated vessel having a spout extending between the interior and the exterior of the vessel. A perforated basket is disposed within the vessel, and percolator means are provided for causing a liquid contained in the vessel to percolate through the basket. This percolator means includes a heater and a percolator tube which extends upwardly from the heater to conduct the liquid heated by the heater to a point in the vessel above the basket. The container of this invention also includes a manually operated pump mounted to the vessel and operative to pump the liquid out of the spout.

Preferably, the manually operated pump is a pressure pump which includes means for pressurizing the vessel to force fluid out of the spout. In order to resolve the conflict between the sealing requirements of the pressure pump and the venting requirements of the percolator means, a first preferred embodiment of this invention includes valve means for providing a normally open vent path between the exterior of the vessel and an upper portion of the interior of the vessel. This vent path provides a route by which steam and pressurized gas that is generated by the percolator means can escape from the vessel. This valve means preferably automatically closes the vent path when the pressure pump is operated, thereby sealing the vessel and allowing the pressure pump to pressurize the vessel to a small extent. In the first preferred embodiment described below, this valve means includes a stem valve which is mechanically actuated by movement of the pressure pump.

The second preferred embodiment of this invention includes a manually operated venting system comprising vent means for selectively opening and closing a vent path between the interior and the exterior of the vessel. Interlock means are provided which are responsive to the vent means for automatically disabling the heater when the vent path is closed and for automatically enabling the heater when the vent path is open. The interlock means insures that the heater cannot be operated unless the vent path is open.

The percolator/dispenser of this invention combines the advantages of a percolator with the advantages of an insulated container having a pump-type dispenser. Coffee can be brewed, held, and then dispensed from a single container in a simple, convenient manner. In this way, the need to transfer coffee from a percolator in which it is brewed to a dispenser in which is held and dispensed is eliminated. A further advantage of the preferred embodiment of this invention is that it allows the use of a manually operated pressure pump to dispense liquid from the container, while not interfering with normal venting of the container during percolation. This allows the advantages of percolators, which generate steam and elevated pressures in use, to be combined with pressure pump dispensers, which require a sealed vessel to work.

The invention itself, together with further objects and attendant advantages, will best be understood by reference to the following detailed description taken in conjunction with the accompanying drawings.

BRIEF DESCRIPTION OF THE DRAWINGS

FIG. 1 is a perspective view of a first preferred embodiment of the percolator/dispenser of this invention.

FIG. 2 is a side elevational view of the percolator/dispenser of FIG. 1 in partial cutaway, showing the lid in a closed position.

FIG. 3 is a partial cross-sectional view taken along line 3—3 of FIG. 1, in which the lid is shown in the closed position.

FIG. 4 is a partial side elevational view corresponding to the view of FIG. 3, in which the lid is shown in the open position.

FIG. 5 is a top view taken along line 5—5 of FIG. 4.

FIG. 6 is a perspective view of the latch 46 of FIG. 3.

FIG. 8 is a sectional view taken along line 8—8 of FIG. 7 showing the spout in the vented position.

FIG. 8a is a sectional view taken along line 8a—8a of FIG. 8.

FIG. 9 is a sectional view corresponding to FIG. 8 showing the spout in the dispensing position.

FIG. 9a is a sectional view taken along line 9a—9a of FIG. 9.

FIG. 10 is a sectional view corresponding to FIG. 8 showing the spout in the sealed position.

FIGURE 10a is a sectional view taken along line 10a—10a of FIG. 10.

FIG. 11 is a sectional view taken along line 11—11 of FIG. 7.

FIG. 12 is a sectional view taken along line 12—12 of FIG. 11.

FIG. 13 is a perspective view of selected components of the embodiment of FIG. 7.

DETAILED DESCRIPTION OF THE PRESENTLY PREFERRED EMBODIMENTS

Figure 7:
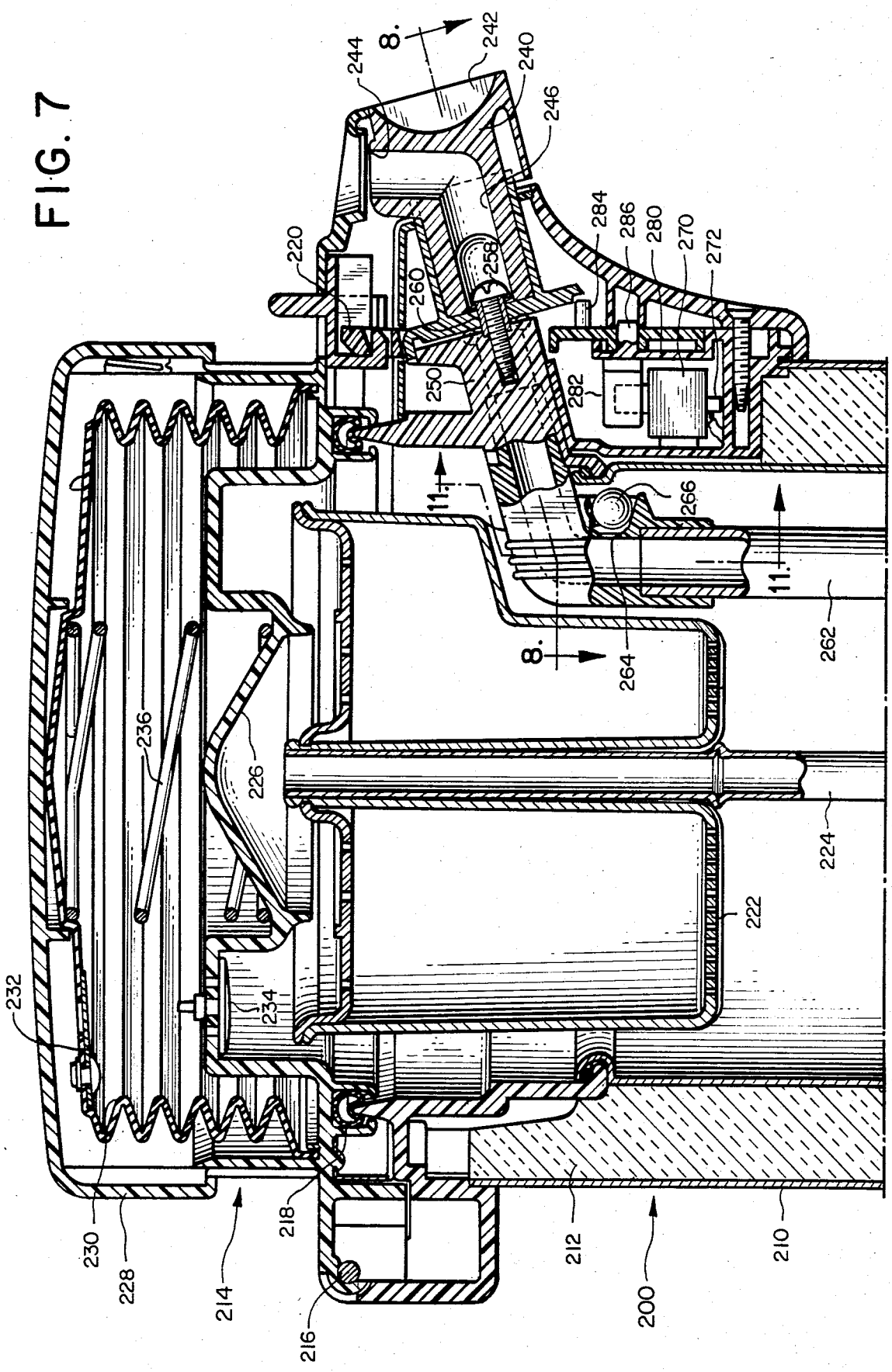
FIG. 7 is a view similar to FIG. 3 of a second preferred embodiment of this invention.

Turning now to the drawings, FIGS. 1 through 6 show various views of a first preferred embodiment of this invention, and FIGS. 7 through 13 show various views of a second preferred embodiment. The following discussion will take up these two embodiments in sequence.

THE FIRST PREFERRED EMBODIMENT

As best shown in FIGS. 1, 2 and 3, the first embodiment 10 includes a container 20 which is made up of an outer cylindrical wall 24 which is mounted to a cylindrical base 28. The container 20 also includes an inner cylindrical wall 22 which is arranged concentrically within the outer wall 24. A foam insulation 26 is disposed between the inner and outer walls 22, 24 to act as a thermal barrier. The container 20 also includes an upper rim 30 which in this preferred embodiment is preferably formed of plastic. This upper rim 30 provides a seal at the upper ends of the inner and outer walls 22, 24, and the upper rim 30 defines a latch keeper 32.

A lid 40 is mounted to the upper rim 30 by means of a hinge pin 42. This lid 40 is provided with an annular, resilient seal ring 44 which is shaped and positioned to form a leak-proof seal against a mating surface of the upper rim 30. A latch 46 is positioned on the lid 40 adjacent the latch keeper 32; the latch 46 is best shown in FIG. 6. When the latch 46 engages the latch keeper 32 and is held in position by the latch spring 47, the lid 40 is held firmly in place against the upper rim 30 such that the seal ring 44 forms a leak-proof seal therebetween. The lid 40 also defines a deflector 48 which is positioned to deflect liquid dispensed from the container 20 downwardly. A handle 50 is pivotably mounted to the upper rim 30, and a liquid deflector 52 is defined by the central lower surface of the lid 40. The lid 40 also defines a plurality of recesses 54, the purpose of which will be described below in conjunction with the cap 82.

A percolator 60 is disposed within the container 20. This percolator 60 includes a well-type heater 62 of conventional manufacture which is mounted in the base 28 to the inner wall 22. This heater 62 is electrically powered by current which is supplied via an electrical cord 64. A thermostat 66 is mounted adjacent the lowermost surface of the inner wall 22, and is used in the conventional manner to control the operation of the heater 62. A lamp 68 is mounted within the base 28 to indicate the status of the heater 62.

A percolator tube 70 is positioned within a well defined by the heater 62 to extend vertically, upwardly from the heater 62. This percolator tube 70 defines at its lower end a baffle of conventional design which directs heated water and steam from the heater 62 into the central passageway defined by the percolator tube 70. A perforated basket 72 is mounted at the upper end of the percolator tube 70 within the container 20. This perforated basket 72 is provided with a basket top 74 which is held in place on the percolator tube 70.

The percolator 60 operates in the conventional manner to direct heated water from the heater 62 to the upper portion of the container 20. This heated water is deflected by the deflector 52 downwardly onto the basket top 74. The heated water then percolates through perforations in the basket top 74 and the basket 72. Preferably, the perforations in the basket 72 and the basket top 74 are large enough to allow water to percolate through the basket 72, but small enough to retain coffee grounds within the basket 72. The basket 72 and percolator tube 70 are configured such that they can readily be removed from the container 20 when the lid 40 is pivoted about the hinge pin 42 to the open position shown in FIGS. 4 and 5.

A pressure pump 80 is mounted to the lid 40 at the upper end of the container 20. This pressure pump 80 includes a cap 82 which is mounted to the lid 40 to move between an upper position (as shown in FIG. 3) and a lower position, in which the cap 82 approaches the lid 40. A seal ring 84 is mounted to the cap 82 to come into sealing contact with the lid 40. The cap 82, seal 84, and lid 40 cooperate to define a sealed chamber 86 therebetween. A coil spring 88 is disposed within the chamber 86 to bias the cap 82 into the upper position shown in FIG. 3. The cap 82 defines a plurality of protrusions 90 which cooperate with the recesses 54 in the lid 40 in order substantially to prevent the cap 82 from rotating on the lid 40. Also, the lid 40 is configured to cooperate with the protrusions 90 to prevent the spring 88 from pushing the cap 82 out of the engagement with the lid 40. The spring 88 is secured against rotation at one end to the lid 40 and at the other end to the cap 82. The spring 88 serves as a torsion spring to bias the cap 82 in a selected direction. The recesses 54 are provided with hooked upper ends oriented such that the spring 88 biases the protrusions 90 into these hooked upper ends. In this way, a positive twisting action is required by the user to free the cap 82 for downward motion. Accidental downward pressure on the cap 82 therefore does not cause it to move downwardly.

The pump 80 also includes an inlet valve 92 mounted on the lid 40. This inlet valve 92 is a flap-valve positioned to cover inlet apertures 94. The inlet valve 92 allows air to flow from the exterior of the container 20 into the chamber 86 when the cap 82 moves from the lower position to the upper position. The inlet valve 92 acts to prevent air from escaping through the inlet apertures 94.

The pump 80 also includes an outlet valve 96 which is positioned to cover outlet apertures 98. In this preferred embodiment, the outlet valve 96 is an umbrella valve which operates as a one-way valve, allowing air to escape from the chamber 86 to the interior of the container 20, while preventing reverse flow.

The inlet valve 92, the outlet valve 96, the cap 82, and the lid 40 cooperate to form a manually operated pressure pump. The spring 88 biases the cap 82 into the upper position shown in FIG. 3. When the cap 82 is pushed downwardly by manual pressure, air within the chamber 86 is forced out of the chamber 86, through the outlet apertures 98, into the interior of the container 20. When the cap 82 is released, the spring 88 returns the cap 82 to the upper position, and the inlet valve 92 allows air to be drawn into the chamber 86 from the exterior of the container 20.

The embodiment 10 also includes a spout 110 which is tubular in construction and includes a horizontal tube 112 which is joined and sealed to a vertical tube 114 to form the spout 110. The vertical tube 114 defines a lower end 116 positioned near the lower surface of the inner wall 22. Liquid which is forced into the vertical tube 114 at the lower end 116 is discharged from the horizontal tube 112 against the deflector 48.

A vent valve 120 is also included in the embodiment 10. This vent valve 120 defines normally open vent paths 122 between the upper portion of the interior of the container 20 (above the licuid level within the container 20) and the interior of the spout 10. These vent paths 122 pass through a cylindrical valve body 124 positioned directly above the vertical tube 114. A valve stem 126 is mounted to slide within the valve body 124. The valve stem 126 defines an O-ring valve seal 128 mounted on an enlarged valve head 130 of the valve stem 126. A valve spring 132 is provided to bias the valve stem 126 upwardly to a rest position as shown in FIG. 3. In this position, the uppermost surface of the valve head 130 comes into contact with a valve actuator 100 which is mounted to the cap 82 and passes through a sealing grommet 56 mounted in the lid 40.

The vent valve 120 operates to maintain normally open vent paths 122 between the upper portion of the interior of the container 20 and the interior of the spout 110. When the valve stem 126 is in the upper position shown in FIG. 3, the valve seal 128 does not form a seal against the valve body 124. However, when the cap 82 is pushed downwardly, the valve actuator 100 moves the valve stem 126 downwardly, thereby compressing the spring 132 and creating a seal between the valve seal 128 and the valve body 124. Once the vent paths 122 are sealed off, air which is forced into the container 20 through the outlet valve 96 by the pump 80 acts to pressurize the interior of the container 20 momentarily and to force liquid to move up the vertical tube 114 and out the horizontal tube 112.

From the foregoing, it should be apparent that a percolator/dispenser has been described which provides a normally open vent path to allow the percolator to operate normally without pressurizing the container 20, yet which acts automatically to seal the container 20 when the pump 80 is used, such that movement of the cap 82 downwardly causes liquid to be dispensed out of the spout 110. In this way, the needs of both the percolator and the pressure pump with respect to venting and sealing are met in a simple and automatic manner. The percolator/dispenser of this invention provides the important advantage that coffee can be brewed by means of the percolator within the container 20, the percolator tube 70, basket 72 and basket top 74 can be removed, and then the percolator/dispenser can be used as an insulated container. Liquid such as coffee can be dispensed easily and readily without opening the container 20 by operating the pump 80.

The foregoing description has been directed to the more important features of this embodiment. The present invention is not directed to details of the percolator, to specific proportions or dimensions, or to specific materials, and such details have therefore been omitted. However, for completeness, and by way of illustration only, the embodiment described above utilizes the following construction details. The inner and outer walls 22, 24 are formed of type 304 stainless steel approximately 0.02 inches in thickness. The insulation 26 is closed cell, ridged polyurethane foam of 2 pound per cubic foot density which is foamed in place. The lid 40, cap 82, handle 50, and miscellaneous parts such as the spout 110, the basket 72, and the top 74 are molded of polypropylene. The valve stem 126 and the valve body 124 are formed of Delrin. The rest spring rate of the spring 88 is 1.5 pounds per inch and the spring 88 as installed has a spring rate of 2.6 pounds per inch. The base 28 is phenolic. The heater 62 is rated at 650 watts, cold resistance, and is similar to the percolator well sold by Vacuum Die Casting Corp. as part no. D-0-49. The percolator tube 70 is formed of aluminum, 0.25 inches in outside diameter with a wall thickness of 1/32 inch. These details are provided merely to define the presently preferred embodiment of the invention, and are not intended to limit the scope of this invention in any way.

Furthermore, it should be understood that the vent valve 120 does not have to be mechanically coupled to the cap 82. To the contrary, a ball-type check valve can be used to allow a slow pressure build-up to vent to the spout, while automatically closing and sealing the container 20 in the event of a rapid pressure build-up within the container 20 such as that occasioned by operation of the pump 80. Alternatively, a pressure release valve can be used in conjunction with a normally closed valve situated to block the spout 110. In this alternate embodiment, the normally closed valve would be opened when necessary to dispense fluids out of the spout 110.

THE SECOND PREFERRED EMBODIMENT

Turning now to FIGS. 7 through 13, the second preferred embodiment 200 of this invention is in many ways similar to the first preferred embodiment described above. For this reason, the following discussion will focus on the differences between the two embodiments.

As best shown in FIG. 7, the second preferred embodiment 200 is a percolator/dispenser which includes an insulated vessel 210 that is made up of an insulated container 212 and a lid 214. The lid 214 is mounted to the container 212 by means of a hinge 216, and a seal 218 seals the interior of the insulated vessel 210 when the lid 214 is in the closed position shown in FIG. 7. A latch 220 holds the lid 214 in its closed position. A percolator basket 222 is mounted on a conduit 224 within the interior of the insulated vessel 210. The conduit 224 is part of a percolator system of the type described in detail above in conjunction with the first preferred embodiment. The lid 214 defines a deflection surface 226 immediately above the upper end of the conduit 224. This deflection surface 226 serves to direct heated water which has passed upwardly through the conduit 224 back down towards the basket 222. The basket 222 and conduit 224 operate as a conventional coffee percolator in the same manner as that described above in conjunction with the first preferred embodiment.

The lid 214 of the insulated vessel 210 includes a cap 228 which is slidable between an upper position as shown in FIG. 7 and a closed position in which the cap 228 moves downwardly. A bellows 230 is positioned under the cap 228 to define a sealed chamber between the cap 228 and the container 212. At least one inlet valve 232 is provided to allow air to move into the interior of the bellows 230 as the cap 228 moves upwardly under the force of the spring 236. Similarly, an outlet valve 234 is provided to allow air to move from the interior of the bellows 230 into the interior of the insulated vessel 210 as the cap 228 is forced downwardly, against the spring bias of the spring 236. Thus, the cap 228 acts as an air pump in a manner quite similar to the pump described above in conjunction with the first preferred embodiment.

The second preferred embodiment of FIGS. 7 through 13 utilizes a somewhat different approach to the venting problem described above. As pointed out above, it is important for safety considerations that the insulated vessel 210 be vented properly when the percolator is operating, and it is important that the insulated vessel 210 be sealed against venting when the cap 228 is used to pump liquids such as coffee out of the container 212.

As best shown in FIG. 7, the insulated vessel 210 includes a dispensing spout 240 which terminates at its outer end in a handle 242. The spout 240 defines a discharge opening 244 which is connected to a tube 246.

The spout 240 is mounted to rotate with respect to a static valve member 250 that is fixedly mounted to the insulated vessel 210. This static valve member 250 defines a dispensing port 252, a vent port 254, and a sealing region 256. A fastener 258 operates in conjunction with a bushing 260 to mount the spout 240 against the valve member 250 such that the spout 240 is free to rotate with respect to the valve member 250. Two O-rings 261 seal the dispensing port 252 and the vent port 254 against the spout 240. A down tube 262 is mounted to the dispensing port 252. This down tube 262 extends to a point near the bottom of the container 212. A portion of the dispensing port 252 near the upper end of the down tube 262 defines a vent opening 264. A ball 266 is captured near the vent opening 264 and is free to move between an open position as shown in FIG. 7, in which the discharge port 252 is vented, and a closed position in which the ball 266 seals the vent opening 264. The outer perimeter of the spout 240 defines a number of teeth 268, the purpose of which will be described below.

A switch 270 is mounted to the insulated vessel 210. The switch 270 includes a pair of terminals 272 which are connected in series with the heater of the percolator included in the insulated vessel 210. This heater, though not shown in FIG. 7, is substantially identical to the heater described in conjunction with the first preferred embodiment. Thus, when the switch 270 is open, current is prevented from reaching the heater of the percolator. Conversely, when the switch is closed, conventional control switches can be used to energize or de-energize the heater and therefor the percolator.

A switch actuator 280 is rotatably mounted to the insulated vessel 210 as shown in FIG. 7. This actuator 280 defines a switch actuating member 282 which is positioned to contact a rocker arm included in the switch 270. In addition, the actuator 280 defines an array of pins 284 which cooperate with the teeth 268 of the spout 240, as described below. A shaft 286 is centrally positioned to define the rotational axis of the actuator 280.

FIG. 13 provides a perspective view of the spout 240, the switch 270 and the actuator 280 to illustrate the manner in which rotation of the spout 240 causes rotation of the actuator 280 and thereby control of the switch 270. In this preferred embodiment, the switch 270 is a normally open switch which is closed when the switch actuating member 282 depresses the rocker arm, as shown in FIG. 13.

Turning now to FIGS. 8 through 10, the operation of the spout 240 of this embodiment can now be described. Basically, the spout 240 has three separate positions as shown in FIGS. 8, 9 and 10, respectively.

FIG. 8 shows the spout 240 in a vent position. In this position the tube 246 of the spout 240 is aligned with the vent port 254 of the valve member 250. As shown in FIG. 8, the vent port 254 is in fluid communication with an upper portion of the interior of the insulated vessel 210. Thus, when the spout 240 is rotated to the vent position shown in FIGS. 8 and 8a, a vent passage is established via the vent port 254, the tube 246, and the discharge opening 244.

As shown in FIG. 8a, when the spout 240 is in the position shown in FIG. 8, the teeth 268 cooperate with the pins 284 to rotate the actuator 280 until the switch actuating member 282 depresses the rocker arm of the switch 270, thereby closing the switch 270. Thus, when the spout 240 is in the vented position shown in FIGS. 8 and 8a, the switch 270 is closed and the heater of the percolator can be operated in the normal manner. The spout 240 is rotated manually to the vented position of FIGS. 8 and 8a when it is desired to operate the percolator.

FIGS. 9 and 9a show the relative positions of the component parts when the spout 240 is rotated to the dispensing position. As shown in FIGS. 9 and 9a, when the spout 240 is in the dispensing position, the tube 246 is aligned with the dispensing port 252. As explained above, the dispensing port 252 is connected via the tube 262 to a lower portion of the interior of the insulated vessel 210. When the spout 240 is in the dispensing position shown in FIGS. 9 and 9a, movement of the cap 228 from the upper position shown in FIG. 7 downwardly causes the interior of the insulated vessel 210 to be pressurized, thereby forcing liquids up the tube 262, out the dispensing port 252 via the tube 246, to the discharge opening 244. Thus, when the spout 240 is in the dispensing position shown in FIGS. 9 and 9a, the pump which comprises the cap 228 can be used to dispense liquid out of the spout 240.

The purpose of the vent opening 264 and the ball 266 is to prevent siphoning when the pump is used to dispense liquid from the insulated vessel 210. During a pumping operation, differential pressure across the ball 266 moves the ball 266 to seal the vent opening 264 and to allow fluid to be pumped out the dispensing port 252. After pumping has been completed, the weight of the ball 266 moves it away from the vent opening 264, thereby preventing any siphoning action from maintaining flow up the tube 262 and out the discharge opening 244.

As shown in FIG. 9a, when the spout 240 is moved to the dispensing position the teeth 268 on the spout 240 automatically rotate the actuator 280 to move the switch actuating member 282 out of contact with the switch 270. When this happens, the switch 270 automatically opens, thereby disabling the heater of the percolator. In this way, the heater and the percolator cannot be accidentally activated when the spout 240 is rotated to the dispensing position and a proper vent passage is no longer provided FIG. 10 shows the spout 240 in an intermediate position in which the tube 246 is aligned with the sealing region 256 of the valve member 250. In this position, the discharge opening 244 is not connected with either the dispensing port 252 or the vent port 254. Rather, the tube 244 is sealed to prevent leakage from the insulated vessel 210. As shown in FIG. 10a, the switch 240 is automatically moved to the open position when the spout 240 is rotated to the sealed position of FIGS. 10 and 10a.

From the foregoing, it should be apparent that the insulated vessel 210 integrates a percolator with a pump type dispenser in a particularly safe and efficient manner. The operator can manually rotate the spout 240 to place the insulated vessel 210 in either the dispensing, the vented, or the sealed positions. The interlock which includes the switch 270 and the actuator 280 automatically insures that the percolator cannot be operated unless the spout 240 is in the vented position and steam produced by the percolator can escape without harm. The operation of this interlock is completely automatic and invisible to the user. In this way, a significant degree of protection against inadvertent overpressurization of the insulated vessel is provided.

Of course, it should be understood that a wide range of changes and modifications to the preferred embodiments described above will be apparent to those skilled in the art. For example, vacuum insulation techniques can be substituted for the foam insulation of the preferred embodiments described above, or a bellows can be substituted for the pump seal ring 84 described above. Furthermore, dimensions and materials can be selected for each individual application, and other types of percolators and valves can be substituted for those shown. It is therefor intended that the foregoing detailed description be regarded as illustrative rather than limiting, and that it be understood that it is the following claims, including all equivalents, which are intended to define the scope of this invention.

We claim:

1. A percolator/dispenser comprising:
   an insulated vessel;
   a spout extending between the interior and the exterior of the vessel;
   a perforated basket inside the vessel;
   percolator means for causing a liquid contained in the vessel to percolate through the basket, said percolator means comprising:
      a heater; and
      a conduit extending upwardly from the heater to conduct the liquid heated by the heater to a portion of the interior of the vessel above the basket;
   a manually operated pump mounted to the vessel and operative to pump the liquid out of the spout;
   a manually operated venting system comprising vent means for selectively opening and closing a vent path between the interior and the exterior of the vessel; and
   interlock means, responsive to the vent means, for automatically disabling the heater when the vent path is closed and for automatically enabling the heater when the vent path is open.

2. The invention of claim 1 wherein the vent means comprises a rotary valve coupled to the spout, said valve having a vent position, in which the spout is vented to an upper portion of the interior of the vessel, and a dispensing position, in which the spout is connected to a lower portion of the interior of the vessel.

3. The invention of claim 2 wherein the interlock means comprises a switch connected in series with the heater and positioned to be activated by the rotary valve such that the switch is closed when the valve is in the vent position and the switch is open when the valve is in the dispensing position.

4. The invention of claim 2 wherein the valve also has a sealed position, in which the spout is sealed off from the interior of the vessel, and wherein the interlock means operates automatically to disable the heater both when the valve is in the dispensing position and when the valve is in the sealed position.

5. The invention of claim 2 wherein the rotary valve comprises:
   a static member which defines a venting port in fluid communication with the upper portion of the interior of the vessel, a dispensing port in fluid communication with the lower portion of the interior of the vessel, and a sealing region; and
   a rotatable member mounted adjacent to the static member for rotation with respect to the static member, said rotatable member defining a tube in communication with the spout and selectively alignable with any one of the venting pot, the dispensing port, and the sealing region as determined by the rotational position of the rotatable member.

6. The invention of claim 5 wherein the interlock means comprises:
   a switch connected in series with the heater and positioned near the rotatable member;
   an actuator rotatably mounted to the vessel and comprising a switch actuating member positioned to operate the switch in accordance with the rotational position of the actuator, and means for engaging the actuator with the rotatable member such that rotation of the rotatable member causes rotation of the actuator;
   said switch actuating member positioned to close the switch when the tube is aligned with the venting port and to allow the switch to open when the tube is aligned with either one of the dispensing port and the sealing region.

7. The invention of claim 5 further comprising:
   a venting opening defined in the dispensing port; and
   a valve member for closing the venting opening during operation of the pump.

8. The invention of claim 7 wherein the valve member is a ball.

9. The invention of claim 1 wherein the percolator means and the basket are adapted for the percolation of coffee.

10. The invention of claim 1 wherein the pump is a pressure pump which comprises means for pressurizing the vessel to force fluid out of the spout.

11. A percolator/dispenser comprising:
    an insulated vessel;
    a perforated basket inside the vessel;
    percolator means, disposed within the vessel, for causing a liquid contained in the vessel to percolate through the basket;
    a cap mounted to the vessel and movable between first and second positions;
    a seal mounted between the cap and a wall of the vessel to seal a space between the cap and the wall;
    first valve means, in communication with the space, for directing air from the exterior of the vessel into the space when the cap is moved from the first position to the second position;
    second valve means, in communication with the space, for directing air from the space into the vessel when the cap is moved from the second position to the first position;
    a valve member mounted to the vessel and defining a dispensing port in communication with a lower portion of the interior of the vessel, a venting port in communication with an upper portion of the interior of the vessel, and a sealing region;

a spout movably mounted to the vessel and selectively alignable with any one of the dispensing port, the venting port and the sealing region;

a switch mounted to the vessel near the spout and connected in series with the percolator means such that the percolator means is disabled when the switch is open and the percolator means is enabled when the switch is closed; and means for coupling the spout to the switch such that the switch is automatically closed when the spout is aligned with the venting port and the switch is automatically opened when the spout is aligned with either the dispensing port or the sealing region in order to positively prevent operation of the percolator means except when the spout is aligned with the venting port.

12. The invention of claim 11 wherein the spout is rotatably mounted to the vessel and wherein the coupling means comprises a disc rotatably mounted to the vessel to engage the spout for rotation therewith and to close the switch at selected angular positions of the spout and the disc.

13. The invention of claim 11 further comprising:
a venting opening defined in the dispensing port; and
a valve member for closing the venting opening when the pressure in the vessel is greater than the pressure in the dispensing port.

14. The invention of claim 13 wherein the valve member is a ball.

15. The invention of claim 11 wherein the dispensing port comprises a tube, positioned within the vessel, such that liquid enters the dispensing port near the bottom of the vessel.

16. The invention of claim 11 wherein the vessel comprises a container and a lid, said container and lid so dimensioned as to allow the basket to be removed from the vessel when the lid is open.

* * * * *

UNITED STATES PATENT AND TRADEMARK OFFICE
CERTIFICATE OF CORRECTION

PATENT NO. : 4,512,246
DATED : April 23, 1985
INVENTOR(S) : William A. Chappell, William J. Tweed and David T. Higgins It is certified that error appears in the above-identified patent and that said Letters Patent is hereby corrected as shown below:

<u>IN THE CLAIMS</u>

In Claim 5 (column 10, line 15), please delete "pot," and substitute therefor --port--.

Signed and Sealed this

Thirtieth Day of September 1986

[SEAL]

Attest:

DONALD J. QUIGG

Attesting Officer

Commissioner of Patents and Trademarks